(12) United States Patent
Lee et al.

(10) Patent No.: US 12,616,931 B2
(45) Date of Patent: May 5, 2026

(54) HIGH PERFORMANCE GAS ADSORBING MATERIAL

(71) Applicant: SPIRITUS TECHNOLOGIES, PBC, White Rock, NM (US)

(72) Inventors: Matthew Nicholson Lee, Los Alamos, NM (US); Benjamin Peter Warner, Los Alamos, NM (US)

(73) Assignee: Spritius Technologies, PBC, White Rock, NM (US)

( * ) Notice: Subject to any disclaimer, the term of this patent is extended or adjusted under 35 U.S.C. 154(b) by 375 days.

(21) Appl. No.: 18/243,789

(22) Filed: Sep. 8, 2023

(65) Prior Publication Data

US 2025/0083090 A1 Mar. 13, 2025

(51) Int. Cl.
   *B01D 53/04* (2006.01)
   *B01J 20/22* (2006.01)

(52) U.S. Cl.
   CPC .......... *B01D 53/0407* (2013.01); *B01J 20/22* (2013.01); *B01D 2253/20* (2013.01); *B01D 2253/31* (2013.01); *B01D 2253/342* (2013.01)

(58) Field of Classification Search
   CPC .... B01D 53/02; B01D 53/04; B01D 53/0407; B01D 2253/20; B01D 2253/31; B01D 2253/342; B01J 20/22; B01J 20/28042; B01J 20/28045
   USPC .............. 96/108; 95/139; 423/230; 502/400, 502/401, 439
   See application file for complete search history.

(56) References Cited

U.S. PATENT DOCUMENTS 6,364,938 B1 * 4/2002 Birbara .................. A62B 11/00
                                                                95/139
2013/0287661 A1 10/2013 Begag et al.
(Continued)

FOREIGN PATENT DOCUMENTS

CN      113813927 A  * 12/2021  .......... B01J 20/3204
EP      23196166.5        2/2024
WO      2021246383 A1   12/2021

OTHER PUBLICATIONS

Machine-generated English translation of CN 113813827 A, published Dec. 21, 2021 (Year: 2021).*
(Continued)

*Primary Examiner* — Frank M Lawrence, Jr.
(74) *Attorney, Agent, or Firm* — CRGO Global; Steven M. Greenberg

(57) ABSTRACT

A high-performance gas adsorbing material includes a monolithic bi-continuous material formed without joints or seams from a sorbent formed predominantly of amine functional groups exclusive of hydrophilic tethers positioned therebetween. For instance, the high-performance gas adsorbing material monolith includes:

a. a bi-continuous structure consisting of a sorbent;

b. a mixture of at least two different amine-containing input molecules providing porous surfaces inside the structure multiplicity of uniform gas pathways therethrough;

c. beta-hydroxy alkyl functional groups accessorizing the sorbent; and, d. different hydrophilic tethers connecting different ones of the beta-hydroxy alkyl functional groups e. wherein the bi-continuous structure is predominantly alkyl amine functional groups exclusive of the different hydrophilic tethers.

11 Claims, 2 Drawing Sheets

(56)  References Cited

U.S. PATENT DOCUMENTS

| | | | |
|---|---|---|---|
| 2013/0338001 A1* | 12/2013 | Giannelis | C01G 27/02 |
| | | | 502/402 |
| 2014/0241966 A1 | 8/2014 | Khunsupat et al. | |
| 2014/0271394 A1* | 9/2014 | Jiang | B01J 20/28045 |
| | | | 427/282 |
| 2014/0311341 A1* | 10/2014 | Jiang | B01J 20/28045 |
| | | | 95/137 |
| 2016/0184736 A1* | 6/2016 | Wyndham | B01D 15/08 |
| | | | 210/198.2 |
| 2020/0239617 A1* | 7/2020 | Al Hamouz | B01D 53/02 |
| 2023/0256377 A1* | 8/2023 | Gebald | B01D 53/0462 |
| | | | 95/139 |
| 2025/0033029 A1* | 1/2025 | Sattler | B01J 20/28061 |

OTHER PUBLICATIONS

Shantipriya Khadka et al., Electrophoresis, Verlag Chemie, Hoboken USA, vol. 37, pp. 3178-3185 (Oct. 4, 2016).
Louise B. Hamdy et al, The application of amine-based materials for carbon capture and utilisation: an overarching view, Mater. Adv. 2, 5843 (2021).
Yace Mi et al, Detailed exploration of structure formation of an epoxy-based monolith with three-dimensional bicontinuous structure, RSC Adv. 5, 55419 (2015).

* cited by examiner

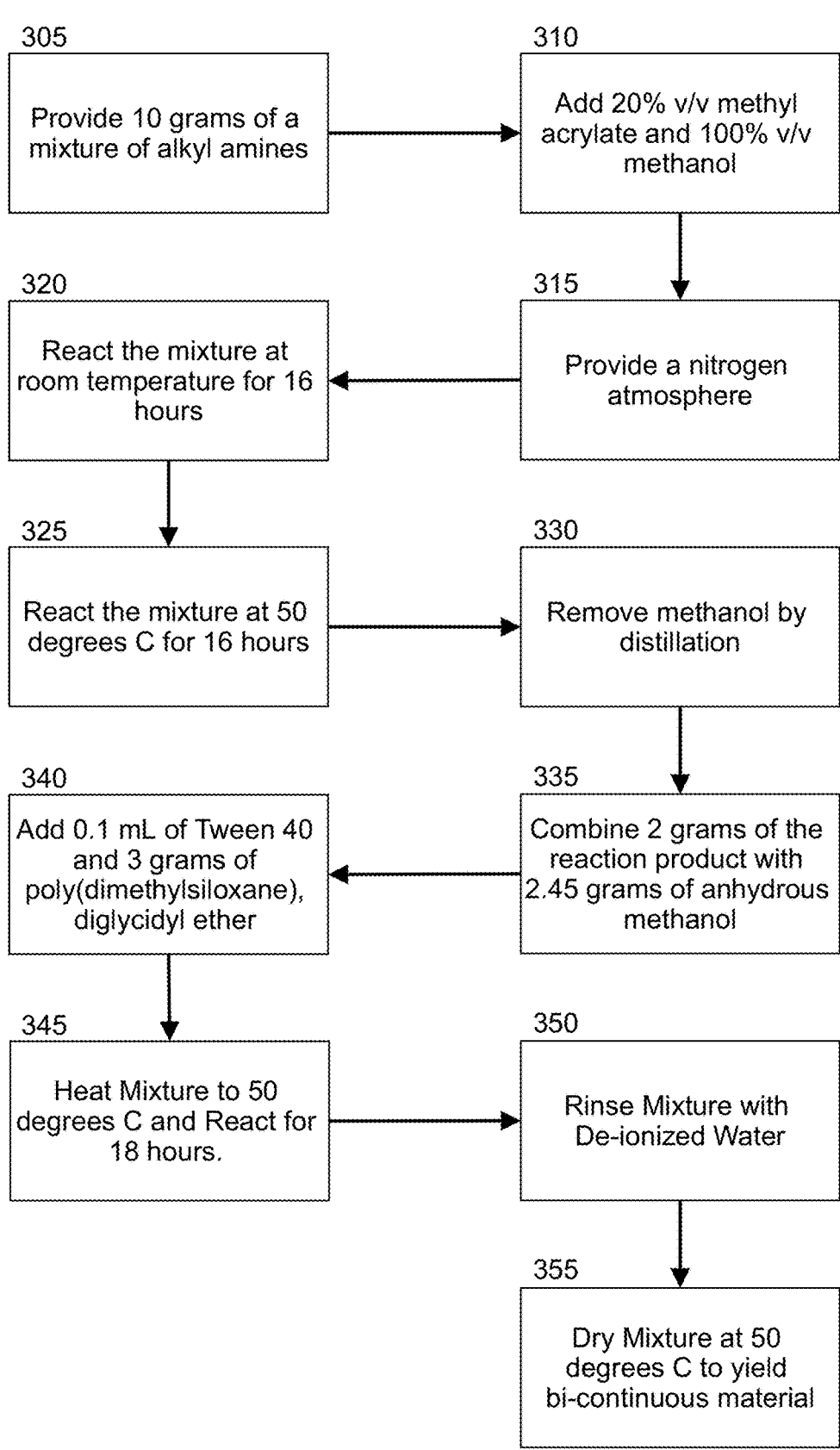

305
Provide 10 grams of a mixture of alkyl amines

310
Add 20% v/v methyl acrylate and 100% v/v methanol

320
React the mixture at room temperature for 16 hours

315
Provide a nitrogen atmosphere

325
React the mixture at 50 degrees C for 16 hours

330
Remove methanol by distillation

340
Add 0.1 mL of Tween 40 and 3 grams of poly(dimethylsiloxane), diglycidyl ether 335
Combine 2 grams of the reaction product with 2.45 grams of anhydrous methanol 345
Heat Mixture to 50 degrees C and React for 18 hours.

350
Rinse Mixture with De-ionized Water

355
Dry Mixture at 50 degrees C to yield bi-continuous material

FIG. 3

HIGH PERFORMANCE GAS ADSORBING MATERIAL

BACKGROUND OF THE INVENTION

Field of the Invention

The present invention relates to the field of gas adsorption and more particularly to a gas adsorption sorbent.

Description of the Related Art

Adsorption refers to the increase in concentration of a substance at an interface of a condensed and a liquid or gaseous layer owing to the operation of surface forces. More concretely, adsorption is the adhesion of molecules of gas, liquid, or dissolved solids to a surface. The adsorption process results in the creation of a film of an adsorbate upon a surface of an adsorbent. Adsorption differs from absorption in which one substance permeates another. As well, whereas adsorption can be characterized as a surface phenomenon, absorption involves the whole volume of the material. Like surface tension, adsorption is a consequence of surface energy.

Adsorption capitalizes upon the tendency of one or more components of a liquid or gas to collect on the surface of a solid. This tendency can be leveraged to remove solutes from a liquid or gas or to separate components that have different affinities for the solid. The process objective may be either waste treatment or the purification of valuable components of a feed stream. In an adsorption process, the solid is called the adsorbent and the solute is known as the adsorbate.

In a bulk material, all the bonding requirements, whether ionic, covalent or metallic, of the constituent atoms of the bulk material are fulfilled by other atoms in the material. However, those atoms on the surface of the adsorbent are not wholly surrounded by other adsorbent atoms and therefore can attract adsorbates. The exact nature of the bonding depends on the details of the species involved, but the adsorption process is generally classified as physisorption characteristic of weak van der Waals forces, or chemisorption which is characteristic of covalent bonding. It is also understood by those of skill in the art, that adsorption also may occur owing to electrostatic attraction.

As to physisorption, the affinity of a fluid component for a particular adsorbent depends upon the molecular characteristics of the adsorbent such as the size, shape, and polarity of the surface of the adsorbent, the partial pressure or concentration in the fluid, and the system temperature. Importantly, the bonding energies in the adsorption process are substantially lower than typical covalent bond energies thus allowing for low energy desorption. As such, the adsorption bonding energy is high enough for adsorption to occur, yet low enough to allow the adsorbent to be regenerated by removing the adsorbed molecules.

Essential to any large-scale adsorption and desorption process, then, is the characteristics of the sorbent, the optimization of use of the surface area of the sorbent in order to achieve a maximum volume of adsorbate bound to the surface of the sorbent, and the resiliency of the structural integrity of the sorbent when subjected to multiple cycles of adsorption and desorption and the wide fluctuation of temperatures to which the sorbent is subject during each of the adsorption and desorption processes. Of note, the foregoing is of little consequence in a laboratory setting where the little sorbent that is required for the purpose of the laboratory is subjected to only a few adsorption and desorption cycles. But in an industrial setting where millions of tons of adsorbate must be processed in a given year utilizing costly sorbent materials, the efficiency of adsorption demonstrated by an adsorption system is of paramount importance.

To that end, in the field of gas chromatography, it is understood that a high surface area sorbent is necessary to achieve efficient gas adsorption. Indeed, the extent to which adsorption based chromatography is effective depends in no small part to the surface area of the supporting structure of the sorbent. Three types of adsorbents are generally used in adsorption chromatography—namely polar acidic supports, polar basic supports, and nonpolar supports, including most typically silica, surface silanol groups and alumina. Other types of supports that can be used in adsorption chromatography are nonpolar adsorbents such as charcoal and polystyrene. Of note, though, none are effective for the purpose of the gas adsorption of carbon dioxide.

The gas adsorption of carbon dioxide has proven critical in the modern technique of direct air capture (DAC) and sequestration (DAC+S). DAC+S involves the direct air capture of carbon dioxide present in atmosphere and the subsequent desorption of the captured carbon dioxide for ultimate sequestration in a storage facility such as an underground geologic chamber. To meaningfully remove large enough quantities of carbon dioxide from the atmosphere so as to reduce the consequence of global carbon dioxide emissions into the atmosphere, DAC+S must be performed at the mega-ton scale. Unfortunately, the sorbents commonly used in chromatography are uniquely unfit for adsorption at the required scale and demonstrate an efficiency far below that which is required to render DAC+S economically feasible. Indeed, in the instance of chromatography, the sorbents are reduced to a powder compressed into small capillary tubes. Amine type adsorbents are avoided owing to the fragility of the capillary tubes and the propensity of amine type adsorbents, ammonia derived, to cause corrosion in the presence of metallic elements of chromatographic instrumentation.

BRIEF SUMMARY OF THE INVENTION

Embodiments of the present invention address deficiencies of the art in respect to the inefficiency and non-resiliency of sorbent materials and provide a novel and non-obvious method, system and computer program product for a high-performance gas adsorbing material demonstrating optimized exposure of gas adsorbing surface area and resiliency across repeated adsorption and desorption cycles. In an embodiment of the invention, a high performance gas adsorbing material includes a monolithic bi-continuous material formed without joints or seams from a sorbent that is formed predominantly of alkyl amine functional groups exclusive of hydrophilic tethers positioned therebetween.

In one aspect of the embodiment, the alkyl amine functional groups are accessorized with beta-hydroxy alkyl functional groups which are connected with a tether. In other aspects of the embodiment:

the bi-continuous material has a three-dimensional structure having a surface, the surface consisting essentially of saddle points.

the bi-continuous material has a three-dimensional structure having a surface definable by the mean curvature of the surface, where the average of the distribution of mean curvatures is zero.

the bi-continuous material has a three-dimensional structure having a surface with an average Gaussian curvature which is negative.

the bi-continuous material has a three-dimensional structure having a surface, wherein the surface is porous.

In further aspects of the embodiment, the bi-continuous material provides a distribution of sizes of pathways therethrough and, optionally, the distribution of sizes of pathways are polymodal. In yet other aspects of the embodiment, a second set of alkyl amine functional groups is provided, wherein the first set of alkyl amine functional groups are derived from a first amine containing oligomer having a first ratio of nitrogen to carbon, and the second set of amine functional groups are derived from a second amine containing oligomer having a second ratio of carbon to nitrogen.

In a specific embodiment of the invention, a high-performance gas adsorbing material monolith includes:

a bi-continuous structure consisting of a sorbent;

a mixture of at least two different amine containing input molecules providing porous surfaces inside the structure and which provide a multiplicity of uniform gas pathways therethrough;

beta-hydroxy alkyl functional groups accessorizing the sorbent; and, different hydrophilic tethers connecting different pairs of the beta-hydroxy alkyl functional groups wherein the bi-continuous structure is predominantly alkyl amine functional groups exclusive of the different hydrophilic tethers.

In yet a further embodiment of the invention, a high-performance gas adsorbing monolith material consists essentially of alkyl amine functional groups. The material includes in this instance a three-dimensional structure having a surface. The surface in turn consists essentially of saddle points, a hierarchy of pathways and amine functional groups.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
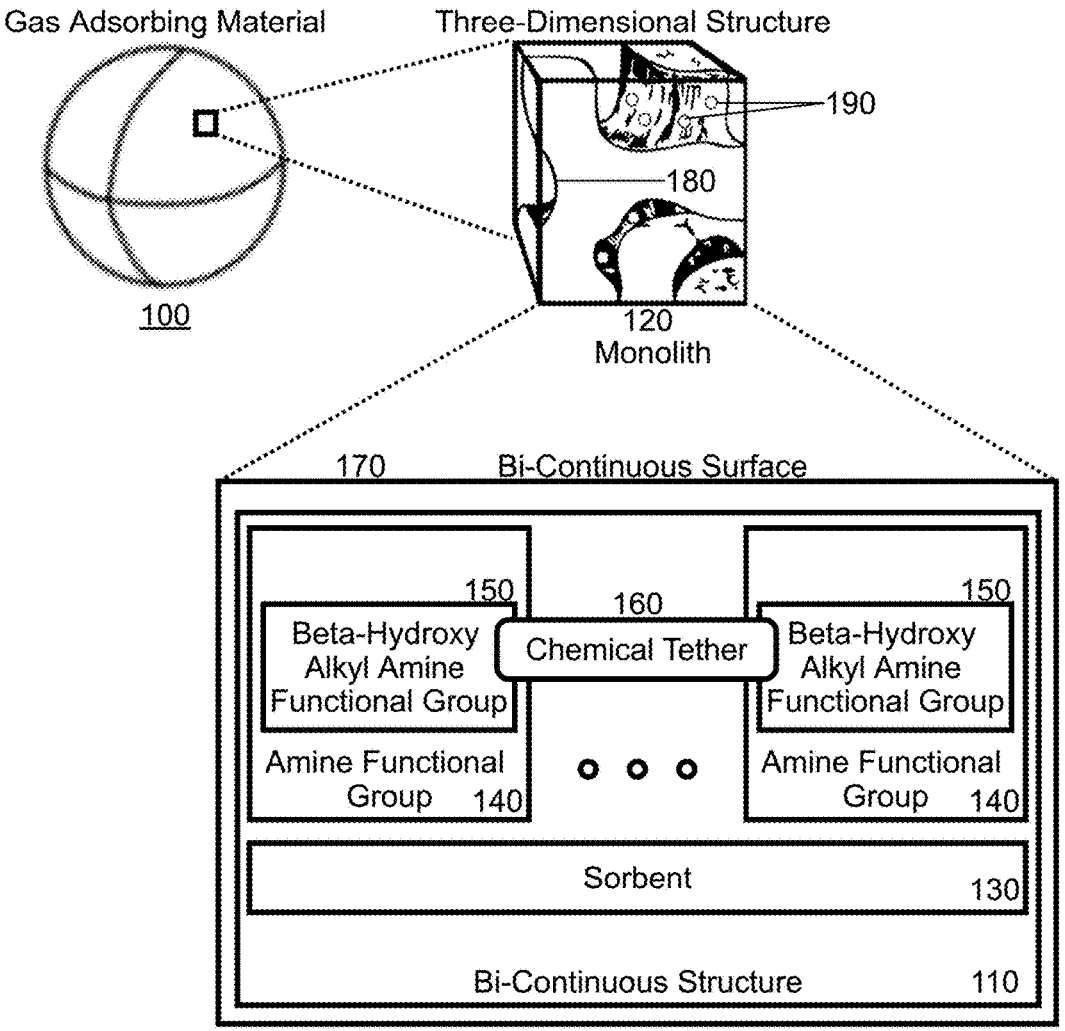
FIG. 1 is schematic diagram of a high-performance gas adsorbing material monolith.

One embodiment of the present invention includes a high-performance gas adsorbing material 100. The high-performance gas adsorbing material 100 preferably includes a bi-continuous structure 110 of a monolith 120. The bi-continuous structure 110 includes a bi-continuous partitioning in which each sub-volume of the structure 110 is filled with a distinct, not necessarily uniform composition or state of matter. An interspersion of two phases is bi-continuous only if each phase is connected across the specimen. Thus, the bi-continuous structure 110 has a continuous, orientable surface 170 without self-intersection. This continuous surface 170 divides the volume of the bi-continuous structure 110 into two interpenetrating sub-volumes, wherein each sub-volume is physically continuous.

As it will be understood by one of skill in the art, the advantage of the bi-continuous structure 110 of the monolith 120 is that the bi-continuous structure 110 provides a large surface area for the high-performance gas adsorbing material 100, so that a sorbate, such as a sorbate in a gas or liquid phase matrix, may readily contact essentially all of the surface 170 of the high-performance gas adsorbing material 100 with minimal difficulty. Further, in so far as the bi-continuous structure 110 includes continuous supports having interconnected skeletal structures, the bi-continuous structure 110 allows for faster mass transfer, higher porosity, and lower back pressure relative to the more common packed bed sorbents of the state of the art. Yet further, the monolithic nature of the bi-continuous structure 110 additionally supports much higher flow rates and lower back pressures because of the combination of high surface area with structural rigidity that prevents compression and maintains flow rates and surface area under pressure.

Of note, the bi-continuous structure 110 is of three-dimensions defined by the geometry of the bi-continuous surface 170 at various locations. The bi-continuous surface 170 can include flat points, saddle points, or a mixture of flat points and saddle points. But, in one aspect of the embodiment, the bi-continuous structure 110 is a three-dimensional structure that consists essentially of only saddle points 180. The advantage of the combination of the bi-continuous structure 110 and the saddle points 180 is that this combination provides a large surface area which allows more efficient gas adsorption.

The bi-continuous surface 170 of the bi-continuous structure 110 may also be characterized by its mean curvature. In this regard, the bi-continuous structure 110 has complex microstructures and nanostructures because the process of synthesizing the bi-continuous structure 110 provides a material that minimizes contact between immiscible chemicals or chemical moieties that produces the bi-continuous surface 170. Hence, the bi-continuous surface 170 can be defined by its curvature at multiple points, when measured at a length scale that disregards any discontinuities or variability caused by the pores 190. The mean curvature at any location provides a measure of the morphology of the bi-continuous structure 110 at that location, which will show variability. However, the distribution of the mean curvatures across the entire bi-continuous structure 170 will have an average value of zero. In order to ensure maximum flow of sorbate containing solutions through the bi-continuous structure 110 while also minimizing back pressure for that flow, the surface 170 has an average mean curvature of zero.

The bi-continuous surface 170 also is characterized by its average Gaussian curvature. The Gaussian curvature at any point is defined by the product of the two principal curvatures at that point. The saddle points 180 have Gaussian curvatures that are negative. Therefore, when the bi-continuous structure 110 has an optimal proportion of saddle points 180, the average Gaussian curvature of surface 170 will be negative.

Finally, the bi-continuous surface 170 is porous with pores 190. The pores 190 further increase the surface area of the bi-continuous structure 110. The pores 190 may be provided by forming the bi-continuous structure 110 using alkyl amines mixed with porogens such as methanol, 1-propanol, 1,4-butanediol, hexane, cyclohexane, cyclohexanol, and toluene.

Owing to the pores 190, the bi-continuous structure 110 provides channels or pathways through the high-performance gas absorbing material 100 that have a size distribution which has a modal size that is defined as the modal channel size, the pores 190 having a size distribution defined as a modal pore size. The modal pore size and the modal channel size can differ by at least one order of magnitude. The high performance gas absorbing material 100 therefore includes multiple pathways, and these multiple pathways provide a polymodal distribution of sizes.

Of note, the bi-continuous structure 110 is formed, without joints or seams, from a sorbent 130. The sorbent 130 includes amine functional groups 140. In this regard, the sorbent 130 is a material that allows for one of more sorbates to be preferentially removed from a gas or liquid matrix that includes additional non-sorbate gasses. The sorbent 130 performs this removal by chemically or physically binding to the sorbate in preference to the non-sorbates. For example, alkyl amines bind to carbon dioxide in preference to binding to oxygen or nitrogen. This binding between the alkyl amines and the carbon dioxide can be caused by covalent chemical bonding, such as the formation of an alkyl carbamate functional group or a carbamic acid functional group, or through electrostatic interactions such as the formation of an alkylammonium bicarbonate or alkylammonium carbonate ion pair.

The formation of the high-performance gas adsorbing material 100 without joints or seams from the sorbent 130 provides for greater durability for the gas adsorbing material 100 by inhibiting the gas adsorbing material 100 from losing sorbent 130 through the mechanical degradation of the gas adsorbing material 100. As well, the formation of the high-performance gas adsorbing material 100 without joints or seams from the sorbent 130 reduces the necessity of extra components to fix the sorbent 130 onto the gas adsorbing material 100. This reduces the complexity of manufacturing the gas adsorbing material 100. As a third advantage, the formation of the high-performance gas adsorbing material 100 without joints or seams from the sorbent 130 reduces the mass that would be provided by using the extra components necessary to otherwise fix the gas adsorbing material 100 onto the sorbent 130 and further, this reduces the energy needed to heat or cool the gas adsorbing material 100.

As noted, the sorbent 130 preferably includes amine functional groups 140. The amine functional groups 140 bind to carbon dioxide preferentially over other interfering gasses such a nitrogen or oxygen that may be mixed with or in solution with carbon dioxide. The amine functional groups 140 may be provided by the use of alkyl amine functional groups, such as those provided by ethylene diamine (CAS Number 107-15-3), diethylene triamine (CAS Number 111-40-0), and other chemicals which provide at least one alkyl amine, and more preferably by other chemicals that provide at least two alkyl amines. The sorbent 130 preferably is formed predominantly of alkyl amines exclusive of any hydrophilic tethers, the alkyl amine being a mass that is provided by the amine containing reagents that are used to synthesize the sorbent 130.

As it will be recognized by one of skill in the art, the provision of two alkyl amines allows for better crosslinking, because one amine crosslinks and the other amine remains available for adding a beta-hydroxy decoration. Further, two amines without excessive inert structure can increase the percentage of the composition that is able to bind carbon dioxide and thus presents as much of the mass of the sorbent 130 to include active sites rather than mere, inert structure. In one aspect of the embodiment, the amine functional groups 140 are provided by a mixture of more than one alkyl amines so as to provide variability in the structure of sorbent 130, which inhibits crystallization of the sorbent 130 that could inhibit gas transport through the sorbent 130 or the gas adsorbing material 100.

The use of multiple alkyl amines may also be conveniently provided by using a mix of oligomers of ethyleneimine, although it should be noted that these oligomers may also be produced by other synthetic routes. Different oligomers of ethyleneimine may be characterized by their ratio of carbon to nitrogen. For example, ethylene diamine has a 2:2 molar ratio of carbon to nitrogen, and diethylene triamine has a molar ratio of 4:3 carbon to nitrogen. Other amines that are not oligomers of ethyleneimine may also be used. The sorbent 130 is prepared from a mixture of amines that have different molar ratios of carbon to nitrogen, and more preferably is prepared from a mixture of different oligomers having different ratios of carbon to nitrogen.

For clarity, the sorbent 130 may be characterized as including a first set of amine functional groups that are derived from an amine having a first molar ratio of carbon to nitrogen, and also comprising a second set of amine functional groups that are derived from an amine having a second molar ratio of carbon to nitrogen, where the first molar ratio of carbon to nitrogen is different than the second molar ratio of carbon to nitrogen. In one aspect of the embodiment, the amines in the sorbent 130 can have the first molar ratio of carbon to nitrogen provide at least 10% of the amines of the sorbent 130. In another aspect of the embodiment, the amines in the sorbent 130 can have the first molar ratio of carbon to nitrogen provide at least 10% of the amines of the sorbent 130 and the second set of amines can have the second molar ratio of carbon to nitrogen provide at least 10% of the amines of the sorbent 130.

Figure 2:
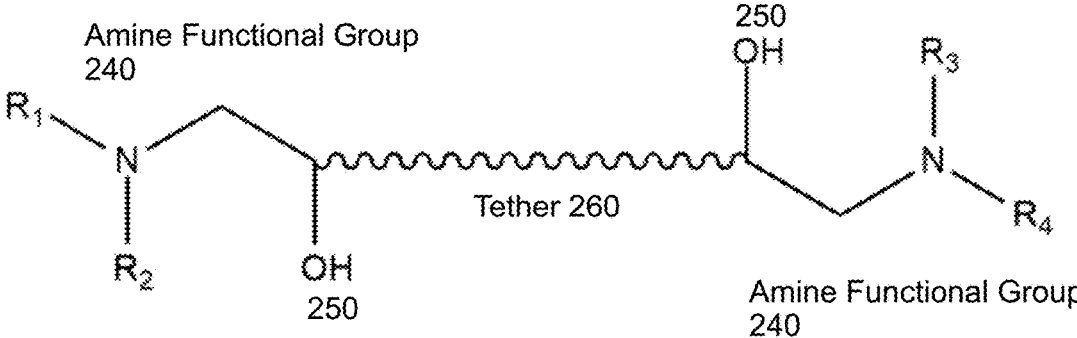
FIG. 2 is a molecular diagram of the high-performance gas adsorbing material monolith of FIG. 1; and, FIG. 3 is a flow chart illustrating a process for formulating the high-performance gas adsorbing material monolith of FIG. 2.

As shown in FIG. 1, the amine functional groups 140 each are a beta-hydroxy alkyl amine functional group 150. The beta hydroxy-alkyl functional group 150 imparts stability to the amine against oxidative degradation and other degradation mechanisms. As further shown in FIG. 1, a portion of the beta-hydroxy alkyl groups 150 can be connected to another by a chemical tether 160 as shown herein:

Referring to FIG. 2, in more particular illustration, the two beta-hydroxy alkyl groups 250 can connect two different ones of the amine functional groups 240 having two different molar ratios of carbon to nitrogen, and the two beta-hydroxy alkyl groups 250 can be coupled to one another with a chemical tether 260.

Turning now to FIG. 3, the bi-continuous structure 110 can be formed from the sorbate 130 by way of the following chemical process: Beginning in block 305, ten grams of a mixture of alkylamines that includes approximately 50% pentaethylenehexamine (CAS 4067-16-7) and 15% tetraethylenepentamine (CAS 112-57-2) and additional uncharacterized alkylamines are provided. An equal volume of anhydrous methanol (CAS 67-56-1) and a 24% volume/volume of methyl acrylate (CAS 96-33-3) are then added to the mixture in block 310 and in block 315, the mixture is placed in a nitrogen atmosphere. In block 320 the mixture is allowed to react for sixteen hours at room temperature. Then, in block 325 the mixture is heated to fifty degrees Celsius and allowed to react for another 16 hours. In block 330 the methanol is then removed by distillation.

In block 335, two grams of the resulting product is mixed with 2.45 grams of anhydrous methanol. Thereafter, in block 340 Tween 40 (0.1 milliliters) (CAS 9005-66-7) is added along with poly(dimethylsiloxane), diglycidyl ether (average molecular weight Mn 800) (2.45 grams) (CAS 130167-23-6). In block 345, the mixture were allowed to react for 18 hours at 50 degrees C. In block 350, the resulting material was then rinsed with deionized water. Then in block 355, the material was dried at 50 degrees C., yielding a bi-continuous material.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A high-performance gas adsorbing material comprising a monolithic bi-continuous material formed without joints or seams from a sorbent formed predominantly of alkyl amine functional groups exclusive of hydrophilic tethers positioned therebetween.

2. The high-performance gas adsorbing material of claim 1, wherein the alkyl amine functional groups are accessorized with beta-hydroxy alkyl functional groups, wherein different pairs of the beta-hydroxy alkyl functional groups are connected with corresponding ones of the hydrophilic tethers.

3. The high-performance gas adsorbing material of claim 1, wherein the bi-continuous material has a three-dimensional structure having a surface, the surface consisting essentially of saddle points.

4. The high-performance gas adsorbing material of claim 1, wherein the bi-continuous material has a three-dimensional structure having a surface with zero mean curvature.

5. The high-performance gas adsorbing material of claim 1, wherein the bi-continuous material has a three-dimensional structure having a surface with an average Gaussian curvature which is negative.

6. The high-performance gas adsorbing material of claim 1, wherein the bi-continuous material has a three-dimensional structure having a surface, wherein the surface is porous.

7. The high-performance gas adsorbing material of claim 1, wherein the bi-continuous material provides a distribution of sizes of pathways therethrough.

8. The high-performance gas adsorbing material of claim 7, wherein the distribution of sizes of pathways are polymodal.

9. The high-performance gas adsorbing material of claim 1, further comprising a second set of alkyl amine functional groups, wherein the second set of alkyl amine functional groups are derived from a first amine containing oligomer having a first ratio of nitrogen to carbon, and the second set of alkyl amine functional groups are derived from a second amine containing oligomer having a second ratio of carbon to nitrogen.

10. A high-performance gas adsorbing material monolith comprising:
   a. a bi-continuous structure consisting of a sorbent;
   b. a mixture of at least two different amine-containing input molecules providing porous surfaces inside the structure and which provide a multiplicity of uniform gas pathways therethrough;
   c. beta-hydroxy alkyl functional groups accessorizing the sorbent; and,
   d. different hydrophilic tethers connecting different ones of the beta-hydroxy alkyl functional groups;
   e. wherein the bi-continuous structure is predominantly alkyl amine functional groups exclusive of the different hydrophilic tethers.

11. A high-performance gas adsorbing monolith material consisting essentially of alkyl amine functional groups, where the material comprises a three-dimensional structure having a surface, said surface consisting essentially of saddle points, a hierarchy of pathways and amine functional groups.

* * * * *